(12) United States Patent
Wood et al.

(10) Patent No.: US 7,861,156 B2
(45) Date of Patent: Dec. 28, 2010

(54) METHODS AND APPARATUS FOR PARALLEL PROCESSING PAGE DESCRIPTION LANGUAGE DATA

(75) Inventors: Patrick H. Wood, Lake Hopatcong, NJ (US); Boris Aronshtam, San Carlos, CA (US); Sol Goldenberg, Newfoundland, NJ (US)

(73) Assignee: Electronics For Imaging, Inc., Foster City, CA (US)

( * ) Notice: Subject to any disclaimer, the term of this patent is extended or adjusted under 35 U.S.C. 154(b) by 1885 days.

(21) Appl. No.: 10/449,559

(22) Filed: May 29, 2003

(65) Prior Publication Data

US 2004/0243934 A1 Dec. 2, 2004

(51) Int. Cl.
*G06F 17/00* (2006.01)
(52) U.S. Cl. ...................................... 715/234
(58) Field of Classification Search ................ 715/513, 715/234
See application file for complete search history.

(56) References Cited

U.S. PATENT DOCUMENTS

| | | | | |
|---|---|---|---|---|
| 5,652,711 A | * | 7/1997 | Vennekens | 358/1.17 |
| 5,825,991 A | * | 10/1998 | Plakosh et al. | 358/1.16 |
| 5,978,563 A | * | 11/1999 | Kawamoto et al. | 358/1.17 |
| 6,295,134 B1 | * | 9/2001 | Hughes | 358/1.13 |
| 6,332,149 B1 | * | 12/2001 | Warmus et al. | 715/517 |
| 2002/0163664 A1 | * | 11/2002 | Sugano | 358/1.15 |

OTHER PUBLICATIONS

"Lessons for Xplor: How to Make a Very Fact Electronic Printer," Seybold Report on Publishing Systems, vol. 22, No. 7, Dec. 21, 1992, www.seyboldreports.com/SRPS/free/0ps22/ps22-07a.htm, downloaded pp. 1-5.*

* cited by examiner

*Primary Examiner*—William L Bashore
*Assistant Examiner*—Henry Orr
(74) *Attorney, Agent, or Firm*—Michael A. Glenn; Glenn Patent Group (57) ABSTRACT

Methods and apparatus for processing a page description language ("PDL") data stream are provided. The methods and apparatus divide the PDL data stream to provide a plurality of PDL segments, create associated first and second data files for each of the PDL segments, and assign the first data file or the second data file associated with each of the PDL segments to at least one of a plurality of PDL processors.

25 Claims, 6 Drawing Sheets

METHODS AND APPARATUS FOR PARALLEL PROCESSING PAGE DESCRIPTION LANGUAGE DATA

FIELD OF THE INVENTION

This invention relates to methods and apparatus for processing page description language data, and more particularly relates to methods and apparatus for converting a page description language data stream that describes an image to a bitmap representation of the image.

BACKGROUND

Documents created in electronic form are often represented in a page description language ("PDL"), such as PostScript, PCL, AgfaScript and IPDS. In a PDL representation, a document may be described in terms of a commands that represent text and graphical objects. To view or print the document, the PDL commands are sent to a raster image processor ("RIP"), which interprets the PDL commands and generates electronic signals used by an output device to render the text and graphical objects. For example, the RIP may be part of a personal computer or workstation, and the output device may be a video display screen. Alternatively, the RIP may be part of a printer controller, and the output device may be a print engine. In either case, the RIP converts the PDL print stream to a raster bitmap.

A raster bitmap represents the pixels displayed or written by an output device and the values used to vary the pixel density. For example, if the density of an output device pixel can have either of two values (e.g., black or white), the bitmap requires one bit for each pixel. For color output devices, a unique bitmap is used for each colorant. Thus, for a print output device that uses cyan, magenta, yellow and black colorants, four bitmaps are used. Therefore, if a document includes an 8"×10" color image at a resolution of 2400 dots/inch, the bitmap for each colorant includes more than 460 million pixels. To print each page of such a document on a high speed color printer (e.g., a 100 page per minute printer), the RIP must generate and provide to the print engine more than three billion bits per second. As a result, RIP processing time often is a bottleneck in achieving high-speed printing. To increase print speed, therefore, it is necessary to decrease the time required for the RIP to interpret a PDL data stream and generate each bitmap.

Previously known techniques for reducing RIP processing time have included parsing a PDL data stream into multiple segments, and then processing the various segments in parallel. For example, Vennekens U.S. Pat. No. 5,652,711 ("Vennekens") describes methods for parallel processing a PDL data stream. In particular, Vennekens describes providing a PDL data stream that includes data commands and control commands to a master process, which divides the PDL data stream into independent data stream segments that are converted to intermediate data stream portions by multiple sub-processes. Data commands describe the data that must be reproduced by the output device, such as text, graphics and images, whereas control commands describe how the data must be reproduced, and may include font descriptions, page sections, forms and overlays. Each independent data stream segment includes data commands to describe the images included in a single page or region (i.e., a disjunctive portion of a physical medium), and also includes control commands to instruct how the data commands must be interpreted.

One disadvantage of this previously known method is its complexity. In particular, to maintain independence between each data stream segment, Vennekens' methods require that each segment know the appropriate "translation state" for the segment, which is composed of all previous control commands from the PDL data stream. To accomplish this goal, Vennekens describes several alternative methods. In one method, the master process builds a translation state description from the control commands in the PDL data stream, and then generates control commands to be included in the header of each independent data stream segment that describe the present translation state for that segment. Alternatively, the master process maintains a "master translation state" and a "common translation state," which is built from control commands that have been processed by all sub-processes. Any sub-process that changes its translation state communicates the change to the master process via a control command reply. In turn, the master process then determines state changes based on differences between the current master translation state and the common translation state. The master process then uses the state changes to determine the control commands to be included in the next independent data stream segment to be generated.

In addition, to maintain independent data stream segments, Vennekens' methods include creating "extended control commands," "version control commands," "segment control commands," and "sync control commands." For some PDLs (e.g., PostScript), however, it would be extremely difficult to implement such additional control commands and intra-process communication. In particular, for many existing PDLs, it would be necessary to modify the source code for the PDL interpreter to provide such commands. In most instances, such source code is unavailable for modification. Even if the source code is available, however, it may still be very complicated to retrofit the PDL interpreter to implement the type of system described by Vennekens.

Further, Vennekens' independent data stream segments each generate an intermediate data stream portion, and the various portions must be combined into a single intermediate data stream portion in the order of the original PDL data stream. However, some intermediate data stream portions may not be generated in the same chronological order as the segments were created. As a result, a combination process is required to rearrange the various intermediate data stream portions in the correct chronological order. This adds additional complexity to an already complicated process. Moreover, Vennekens' method appears to be limited to parsing a PDL data stream into non-overlapping regions of the document image, and provides no description of how it is possible to divide overlapping segments of an image between multiple processors.

In view of the foregoing, it would be desirable to provide improved methods and apparatus for parallel processing multiple segments of a PDL data stream.

It further would be desirable to provide methods and apparatus for parallel processing multiple segments of a PDL data stream, without requiring modification to the source code of a PDL interpreter.

It additionally would be desirable to provide methods and apparatus for parallel processing multiple segments of a PDL data stream, in which the segments may represent overlapping portions of a document image.

SUMMARY

In view of the foregoing, it is an object of this invention to provide improved methods and apparatus for parallel processing multiple segments of a PDL data stream.

It further is an object of this invention to provide methods and apparatus for parallel processing multiple segments of a PDL data stream, without requiring modification to the source code of a PDL interpreter.

It additionally is an object of this invention to provide methods and apparatus for parallel processing multiple segments of a PDL data stream, in which the segments may represent overlapping portions of a document image.

These and other objects of this invention are accomplished by providing methods and apparatus for processing a page description language ("PDL") data stream that describes a document. The methods and apparatus divide the PDL data stream to provide a plurality of PDL segments, and then create associated first and second data files for each of the PDL segments. The segments may correspond to pages in the document, objects in the document, or combinations thereof. The first data file or the second data file associated with each of the PDL segments are then assigned to at least one of a plurality of PDL processors. The assignment may be made to the next available PDL processor, or may be based on the capabilities of the various processors and the nature of the various segments. Thus, segments that include color objects may be assigned to processors optimized to process color data, whereas segments that include black and white objects may be assigned to general purpose PDL processors.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Figure 1:
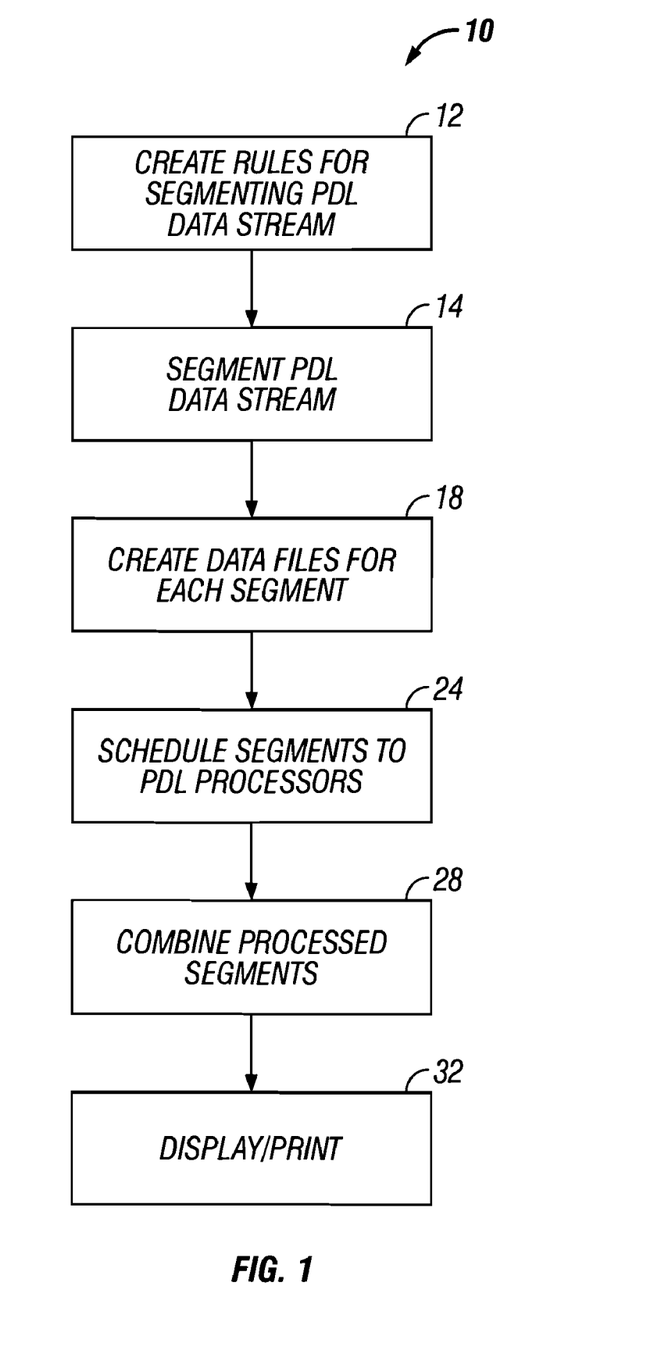
FIG. 1 is a block diagram of an exemplary process in accordance with this invention.

Referring to FIG. 1, an exemplary method in accordance with this invention is described. Exemplary method 10 begins at step 12, in which one or more rules are created for determining how a PDL data stream describing a document will be segmented. For example, a rule may specify that the PDL data stream should be divided into individual pages, with each page assigned to a unique segment. In this regard, if the page description language used to describe the document includes an end-of-page command, the PDL data stream may be segmented by scanning for the occurrence of each end-of-page command, and separating the PDL commands on that basis. Alternatively, a rule may specify that the PDL data stream should be divided into multi-page segments. For example, each consecutive set of two pages may be assigned to a unique segment.

The segmentation rules need not, however, require that each segment include entire pages or multiples pages of the PDL data stream. Thus, a rule may specify that the PDL data stream should be divided based on specific types of PDL objects. For example, the segmenting rule may specify that graphics objects and text objects will be split out as separate segments. Persons of ordinary skill in the art will understand that other segmenting rules may be created, and that compound segmenting rules may be applied. Thus, a first segmenting rule may be used to create a separate segment for each page, and a second segmenting rule may create a separate segment for each object within each page.

Figure 2A:
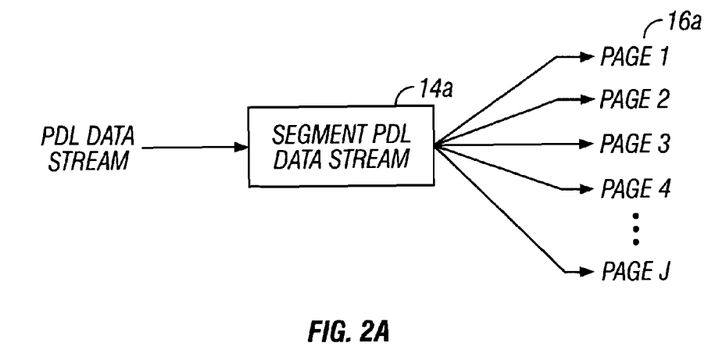
FIG. 2A is a diagram of an exemplary segmentation process in accordance with this invention.
Figure 2B:
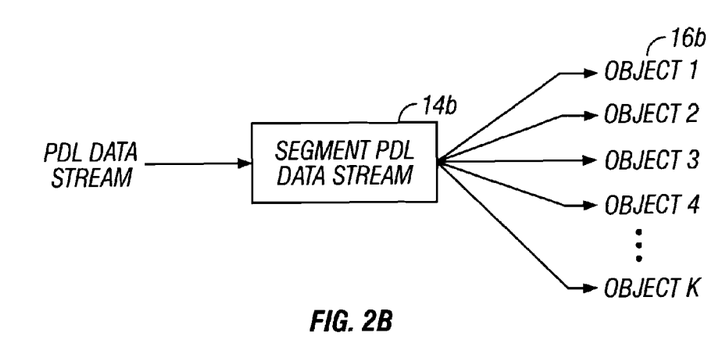
FIG. 2B is a diagram of another exemplary segmentation process in accordance with this invention.

Referring again to FIG. 1, at step 14, a received PDL data stream is segmented based on the rules created in step 12. Referring to FIG. 2, exemplary segmentation operations in accordance with this invention are described. In FIG. 2A, segmenting process 14a divides the PDL data stream into page-based segments 16a. Thus, if the PDL data stream describes J pages, segmenting process 14a will divide the PDL data stream into J separate segments, with each segment associated with a unique one of the J pages. Alternatively, in FIG. 2B, segmenting process 14b divides the PDL data stream into object-based segments 16b. Thus, for example, Object 1 may correspond to a first graphics object in the PDL data stream, Object 2 may correspond to a first text object in the PDL data stream, Object 3 may correspond to a second graphics object in the PDL data stream, Object 4 may correspond to a second text object in the PDL data stream, and so on.

Figure 2C:
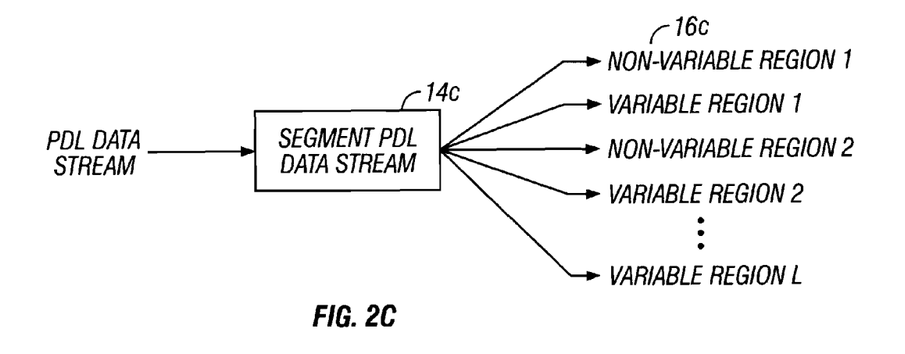
FIG. 2C is a diagram of another exemplary segmentation process in accordance with this invention.

FIG. 2C illustrates another exemplary segmentation process in accordance with this invention for use with a PDL data stream that describes a variable data document that includes variable data portions and fixed-data portions. Exemplary segmenting process 14c divides the PDL data stream into variable-data and non-variable data segments 16c. Thus, for example, non-variable region 1 may correspond to a first non-variable region in the PDL data stream, variable region 1 may correspond to a first variable region in the PDL data stream, non-variable region 2 may correspond to a second non-variable region in the PDL data stream, variable region 2 may correspond to a second variable region in the PDL data stream, and so on. As described above, segmenting process 14 may apply other similar segmenting rules for dividing the PDL data stream into multiple segments 16.

Referring again to FIG. 1, at step 18, two data files are created for each segment created in step 14. In particular, for each segment 16, an associated global data file 20 and an associated segment data file 22 are created. Each global data file 20 includes all PDL operations from the associated segment that might affect subsequent segments. For example, global data files 20 may include font settings, fill pattern settings, forms from variable data files, context settings or other similar settings that may be carried over to subsequent segments. Each segment data file 22, in contrast, includes all PDL commands necessary to interpret the associated segment (including everything in the global data file associated with that segment).

Figure 3:
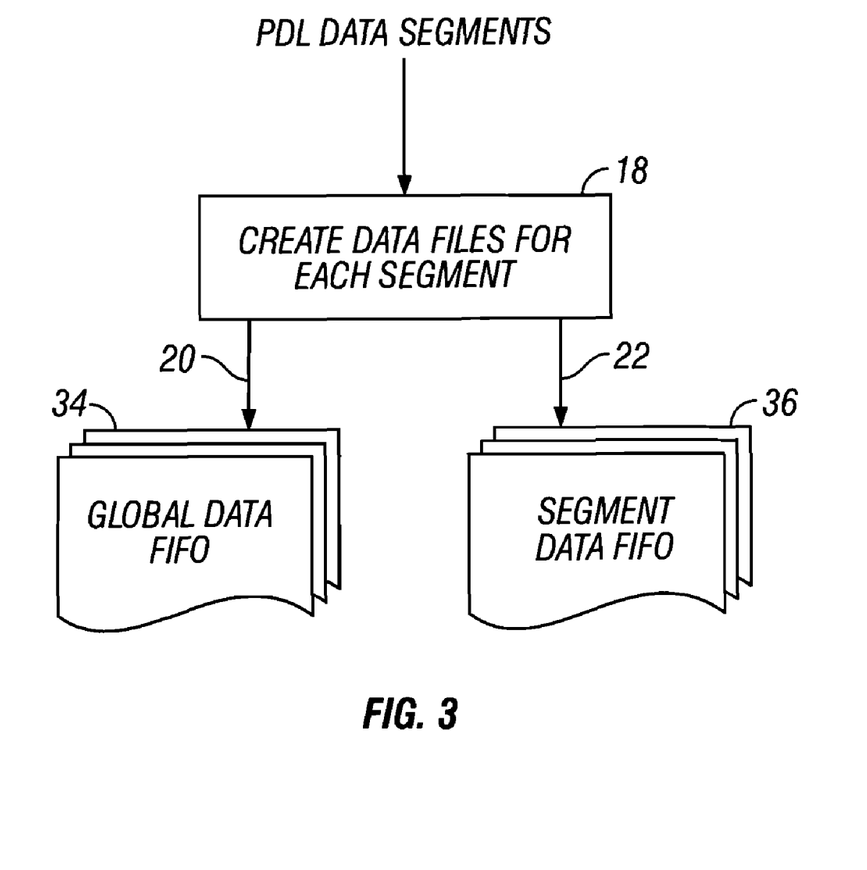
FIG. 3 is a diagram of an exemplary process for creating data files in accordance with this invention.

Referring to FIG. 3, an exemplary method for creating data files 20 and 22 in accordance with this invention is described. In particular, data file creation process 18 receives PDL data segments 16, and then creates a global data file 20 and an segment data file 22 for each associated segment, and stores the data files 20 and 22 in memory buffers 34 and 36, respectively. Specifically, global data files 20 are stored in global data file memory buffer 34, and segment data files 22 are stored in segment data file memory buffer 36. Memory buffers 34 and 36 may be any conventional memory devices, such as first-in, first-out ("FIFO") memory buffers, integrated circuit memory devices, floppy disks, optical disks, hard disks, redundant arrays of inexpensive disks, or any similar memory devices. Memory buffers 34 and 36 store the global data files 20 and segment data files 22 for use by one or more PDL processors, as described below.

Figure 4:
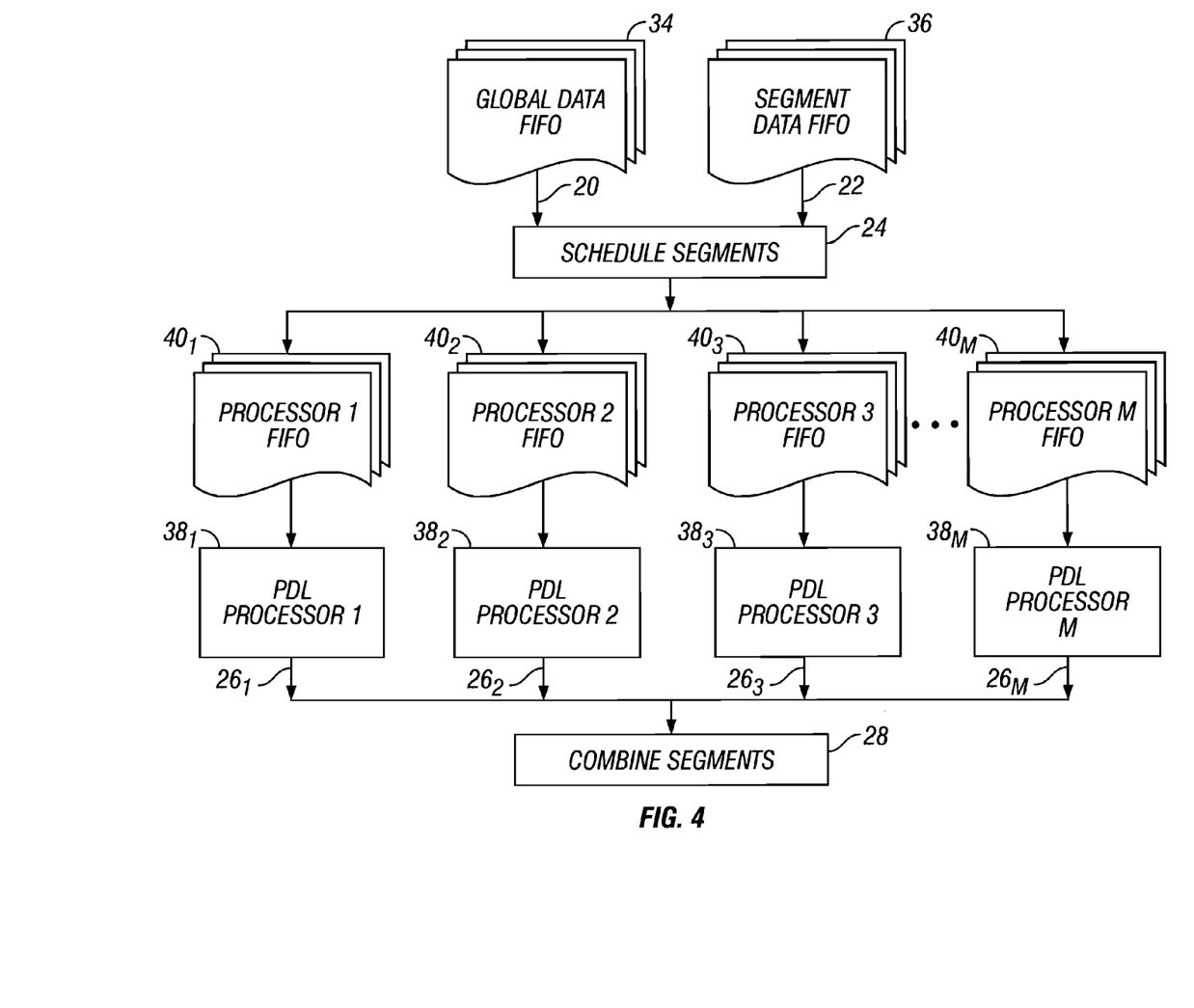
FIG. 4 is a block diagram of an exemplary process for assigning data files for processing in accordance with this invention.

Referring again to FIG. 1, at step 24, the data files created in step 18 are scheduled for processing by one or more PDL processors. FIG. 4 illustrates an exemplary PDL scheduler in accordance with this invention. In particular, scheduling process 24 accesses global data files 20 and segment data files 22 from memory buffers 34 and 36, respectively, and then distributes the data files to PDL processors $38_1, 38_2, 38_3, \ldots, 38_M$. The data files may be provided directly to PDL processors $38_1, 38_2, 38_3, \ldots, 38_M$, or may be stored in corresponding memory buffers $40_1, 40_2, 40_3, \ldots, 40_M$, respectively, associated with the PDL processors. Memory buffers $40_1, 40_2, 40_3, \ldots, 40_M$ may be any conventional memory devices, such as FIFO memory buffers, integrated circuit memory devices, floppy disks, optical disks, hard disks, redundant arrays of inexpensive disks, or any similar memory devices. If memory buffers $40_1, 40_2, 40_3, \ldots, 40_M$ are used, several data files may be queued up for each processor, so that no PDL processor runs out of data files to process.

Each of PDL processors $38_1, 38_2, 38_3, \ldots, 38_M$ may be any conventional software PDL interpreter, hardware PDL interpreter, or combination of software and hardware PDL interpreter. Each of PDL processors $38_1, 38_2, 38_3, \ldots, 38_M$ may include the same PDL interpreter, or may include different PDL interpreters. Thus, PDL processor $38_1$ may include a PDL interpreter for a first page description language, PDL processor $38_2$ may include a PDL interpreter for a second page description language, PDL processor $38_3$ may include a PDL interpreter for a third page description language, and so on. PDL processors $38_1, 38_2, 38_3, \ldots, 38_M$ may be implemented using one or more personal computers, workstations, mainframe computers, microprocessors, custom integrated circuits, or any similar computing devices, or any combination thereof. For example, PDL processor $38_1$ may be implemented on a first computing device, PDL processor $38_2$ may be implemented on a second computing device, PDL processors $38_3$ and $38_4$ may be implemented on a third computing device, and so on. PDL processors $38_1, 38_2, 38_3, \ldots, 38_M$ each may be the same type of processor, or may be composed of different types of processors. For example, PDL processor $38_1$ may be a general purpose processor, PDL processor $38_2$ may be a special-purpose processor customized to perform color image processing, PDL processor $38_3$ may be a fast processor, PDL processor $38_4$ may be a slow processor, and so on.

Scheduling process 24 may assign data files 20 and 22 to PDL processors $38_1, 38_2, 38_3, \ldots, 38_M$ using any suitable technique for allocating data files between the various processors. For example, scheduling process 24 may distribute data files 20 and 22 between PDL processors $38_1, 38_2, 38_3, \ldots, 38_M$ by sequentially assigning data files to the next available PDL processor. In this regard, the workload of processing data files 20 and 22 may be automatically load-balanced between the various PDL processors.

Figure 5A:
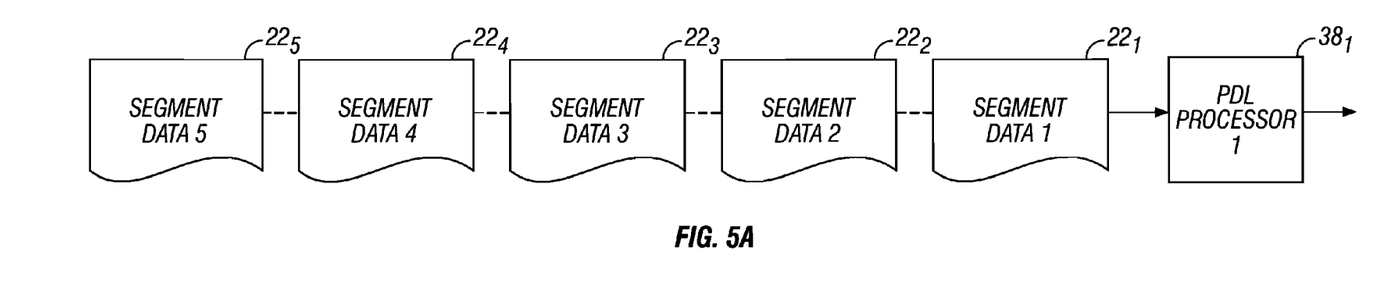
FIG. 5A is a diagram of an exemplary data file processing assignment in accordance with this invention.
Figure 5B:
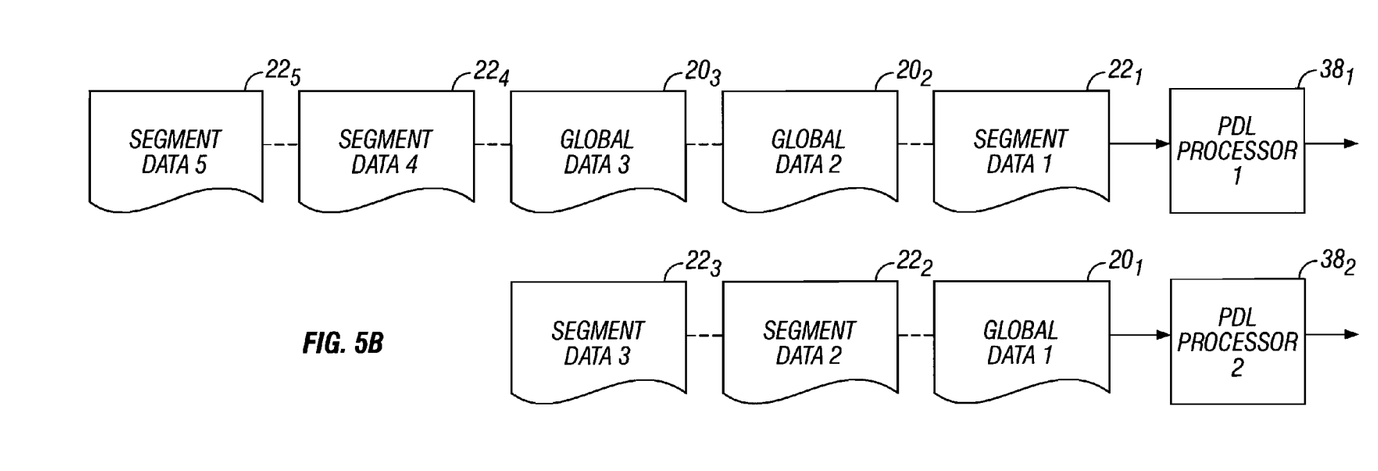
FIG. 5B is a diagram of another exemplary data file processing assignment in accordance with this invention.

Alternatively, scheduling process 24 may implement other techniques for distributing PDL data files. For example, scheduling process 24 may assign data files associated with text segments to processors that are customized for interpreting text data, and may assign data files associated with image segments to processors that are customized for interpreting image data. Scheduling process 24 may assign data files that include black and white images (or lower complexity images) to slow processors, and may assign data files that include color images (or more complex images) to fast processors. Scheduling process 24 may assign data files that include commands from a first page description language to processors that include an interpreter for the first page description language, and may assign data files that include commands from a second page description language to processors that include an interpreter for the second page description language. Persons of ordinary skill in the art will understand that other similar techniques may be used to assign data files 20 and 22 between PDL processors $38_1, 38_2, 38_3, \ldots, 38_M$. When assigning data files 20 and 22 to PDL processors $38_1, 38_2, 38_3, \ldots, 38_M$, scheduling process 24 accounts for the order-dependence of the data files. That is, before a PDL processor may process a specific segment data file (e.g., segment file $22_K$), the processor must first process either the global data files 20 or segment data files 22 for all previous segments (i.e., global data files $20_1, 20_2, \ldots, 20_{K-1}$ or segment data files $22_1, 22_2, \ldots, 22_{K-1}$). FIG. 5 illustrates several examples for processing a PDL data stream that has been divided into five segments, and that may be assigned to any of three PDL processors. In FIG. 5A, all five segments of the PDL data stream are assigned to PDL processor $38_1$, which interprets all five segment data files $22_1$ through $22_5$ for subsequent display or printing. In FIG. 5B, in contrast, three segments are assigned to PDL processor $38_1$, and two segments are assigned to PDL processor $38_2$. In particular, the first, fourth and fifth segments of the PDL data stream are assigned to PDL processor $38_1$, which interprets segment data file $22_1$, global data files $20_2$ and $20_3$, and segment data files $22_4$ and $22_5$. The second and third segments of the PDL data stream are assigned to PDL processor $38_2$, which interprets global data file $20_1$ and segment data files $22_2$ and $22_3$. This type of scheduling may be useful, for example, if the first, fourth and fifth segments include color images, and processor $38_1$ is optimized for processing color objects, whereas the second and third segments include black and white images, and processor $38_2$ may be a slower, general purpose PDL processor.

Figure 5C:
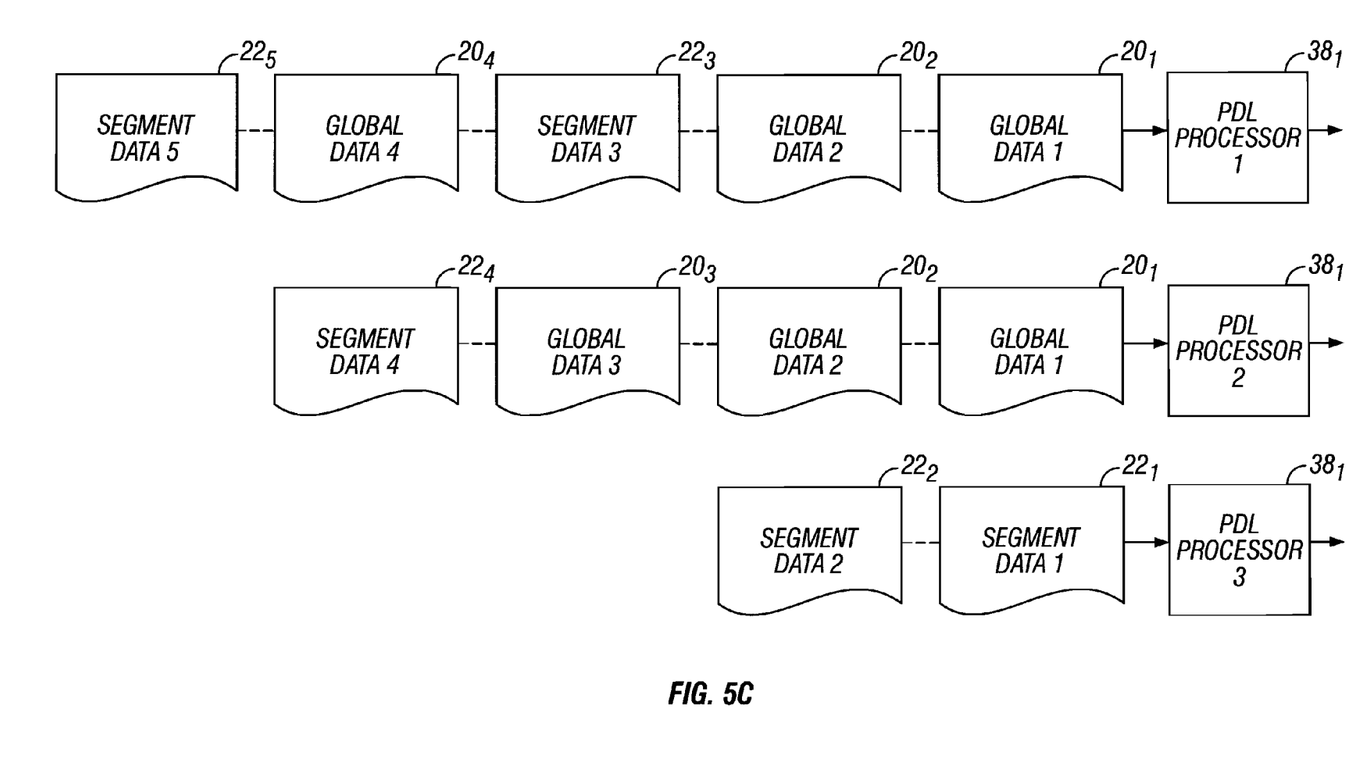
FIG. 5C is a diagram of another exemplary data file processing assignment in accordance with this invention.

Referring now to FIG. 5C, two segments are assigned to PDL processor $38_1$, one segment is assigned to PDL processor $38_2$, and two segments are assigned to PDL processor $38_3$. In particular, the third and fifth segments of the PDL data stream are assigned to PDL processor $38_1$, which interprets global data files $20_1$ and $20_2$, segment data file $22_3$, global data file $20_4$, and segment data file $22_5$. The fourth segment of the PDL data stream is assigned to PDL processor $38_2$, which interprets global data files $20_1, 20_2$ and $20_3$, and segment data file $22_4$. The first and second segments of the PDL data stream are assigned to PDL processor $38_3$, which interprets segment data files $22_1$ and $22_2$. This type of scheduling may be useful, for example, if the third and fifth segments include text, and processor $38_1$ is optimized for processing text, the fourth segment includes black and white images, and processor $38_2$ is optimized for processing black and white images, and the first and second segments include color images, and processor $38_3$ is optimized for processing color images.

In addition, methods and apparatus in accordance with this invention may schedule segments based on the complexity of the segments. For example, scheduling process 24 may gauge the complexity of each segment based on the PDL commands included in each segment, and may assign more complex segments to faster PDL processors and less complex pages to slower PDL processors. In this regard, the presence of certain types of PDL commands in a segment may be used as a proxy for the complexity of the segment. Persons of ordinary skill in the art will understand that other techniques also may be used to estimate the complexity of the PDL segments.

Referring again to FIG. 1, at step 28, the processed PDL segments are combined to form a composite bitmap. As described above, the PDL segments may represent entire pages of the original document, or may represent portions of such pages. In this regard, the PDL segments may include non-overlapping segments (i.e., disjunctive objects of one or more pages), overlapping segments (i.e., overlapping objects of one or more pages), or combinations of non-overlapping and overlapping segments. If the processed segments correspond to overlapping objects, combining process 28 must recombine the processed segments in the same sequential order that the segments appeared in the original PDL data stream. If, however, the processed segments correspond to non-overlapping objects, the processed segments need not be recombined in any particular order. Further, combining process 28 may be used to move, scale, rotate, and re-order the objects in the final document. Finally, at step 32, the combined bitmap may be displayed or printed on an output device, such as a display monitor or a printer.

Persons of ordinary skill in the art will understand that methods in accordance with this invention may be implemented in the form of computer-executable instructions, such as software modules, that may be executed by one or more computer devices. Such software modules may include routines, programs, objects, components, data structures, etc. that perform tasks or implement particular abstract data types. Persons of ordinary skill in the art further will recognize that methods and apparatus in accordance with this invention may be implemented using steps or devices other than those shown and discussed above. All such modifications are within the scope of the present invention, which is limited only by the claims that follow.

We claim:

1. A method for processing a page description language ("PDL") data stream that describes a document, the method comprising:
    creating a segmenting rule for segmenting the PDL data stream;
    segmenting the PDL data stream according to the segmenting rule to provide a plurality of PDL segments;
    creating for each of the PDL segments an associated first data file and a second data file;
    providing a plurality of PDL processors;
    assigning the first data file or the second data file associated with each of the PDL segments to at least one of the PDL processors;
    processing the first and second data files with the PDL processors;
    combining the processed data files to form a composite bitmap; and
    displaying the composite bitmap on an output device.

2. The method of claim 1, wherein the segmenting rule comprises dividing the PDL data stream on a page basis.

3. The method of claim 1, wherein the segmenting rule comprises dividing the PDL data stream on an object basis.

4. The method of claim 1, wherein the segmenting rule comprises dividing the PDL data stream into non-overlapping objects.

5. The method of claim 1, wherein the segmenting rule comprises dividing the PDL data stream into overlapping objects.

6. The method of claim 1, wherein the segmenting rule comprises dividing the PDL data stream into overlapping and non-overlapping objects.

7. The method of claim 1, wherein the document comprises a plurality of pages, and each of the PDL segments corresponds to a unique one of the pages.

8. The method of claim 1, wherein the document comprises a plurality of pages, and one of the PDL segments corresponds to a unique plurality of the pages.

9. The method of claim 1, wherein the document comprises a plurality of objects, and each of the PDL segments corresponds to a unique one of the objects.

10. The method of claim 1, wherein the document comprises a plurality of objects, and one of the PDL segments corresponds to a unique plurality of the objects.

11. The method of claim 1, wherein the document comprises a variable data object and a non-variable data object, and one of the PDL segments corresponds to the variable data object, and another PDL segments corresponds to the non-variable data object.

12. The method of claim 1, wherein the document comprises a plurality of variable data objects and a plurality of non-variable data objects, and one of the PDL segments corresponds to the variable data object, and each of the PDL segments corresponds to a unique one of the variable data objects or the non-variable data objects.

13. The method of claim 1, wherein the first data file comprises all PDL operations from the associated segment that might affect subsequent segments.

14. The method of claim 1, wherein the second data file comprises all PDL operations from the associated segment that are necessary to interpret the associated segment.

15. The method of claim 14, wherein the second data file comprises the first data file.

16. The method of claim 1, further comprising storing the first and second data files in memory.

17. The method of claim 16, wherein the memory comprises first-in, first-out memory.

18. The method of claim 1, wherein the PDL processors comprise a page description language interpreter.

19. The method of claim 1, wherein the PDL processors comprise a plurality of page description language interpreters.

20. The method of claim 1, wherein the PDL processors comprise the same type of processor.

21. The method of claim 1, wherein the PDL processors comprise a plurality of different types of processors.

22. The method of claim 1, further comprising providing a plurality of memory devices associated with the PDL processors.

23. The method of claim 22, wherein the memory devices comprise first-in, first-out memory devices.

24. The method of claim 1, wherein assigning comprises assigning the first data file or the second data file associated with each of the PDL segments to the next available PDL processor.

25. The method of claim 1, wherein assigning comprises assigning the first data file or the second data file associated with each of the PDL segments based on capabilities of the PDL processors.

* * * * *